Oct. 28, 1930.  F. B. HAGAR  1,779,769
RIP SAW TROUGH
Filed Aug. 21, 1929
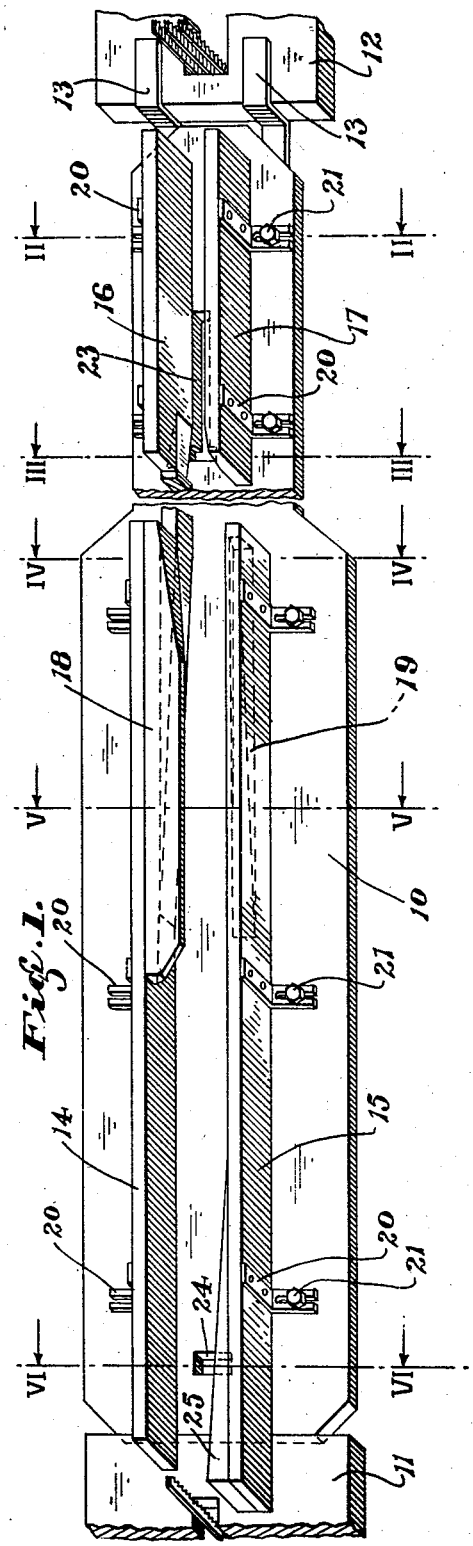
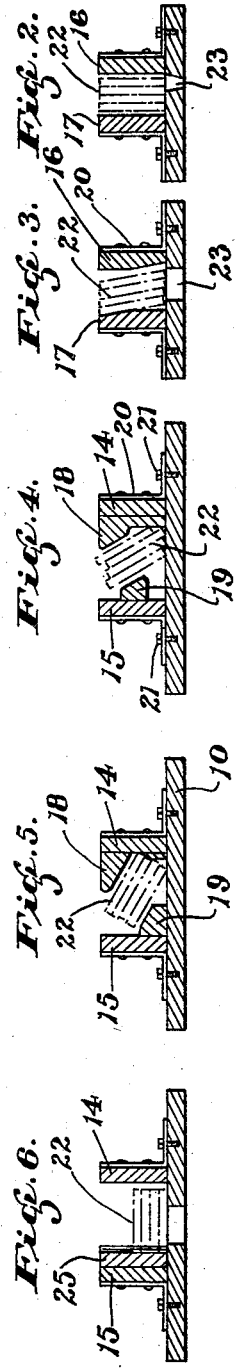
INVENTOR.
Floyd B. Hagar.
BY
Townsend, Loftus & Abbett
ATTORNEYS.

Patented Oct. 28, 1930

1,779,769

UNITED STATES PATENT OFFICE

FLOYD B. HAGAR, OF SACRAMENTO, CALIFORNIA

RIP-SAW TROUGH

Application filed August 21, 1929. Serial No. 387,352.

My present invention relates to a new and improved type of rip trough and more particularly to a rip trough of simple construction which may be readily used in connection with a plurality of independently operating saws.

The object of my invention is to provide a new, novel, simple and inexpensive rip saw trough which may be readily disposed between a pair of board sawing machines.

Another object of my invention is to provide in connection with a rip saw trough of the above character, a novel arrangement of guide members which will serve as the boards are passed thereover to turn the latter and cause them to be presented to a second saw at an angle different from that at which they passed through the preceding saw.

For the purpose of facilitating an understanding of my invention, I have shown by way of illustration and not of limitation, a rip saw trough which embodies the several aspects of my invention.

In the drawing—

Fig. 1 is a view in perspective, looking downwardly upon my improved rip saw trough, and Figs. 2, 3, 4, 5, and 6 are sectional views taken upon the corresponding section-indicating lines appearing on Fig. 1, looking in the direction of arrows.

In Fig. 1 of the drawing, 10 designates a portion of my improved rip saw trough which is in the nature of a horizontally disposed flat supporting member. This member 10 is adapted to be supported at its ends between the two saw machines 11 and 12, so that its upper surface will lie on a level with the bed plane of the two sawing machines 11 and 12. This arrangement of the member 10 is accomplished at its right hand end by means of overhanging hooks 13 which rest upon the surface of the machine 12, and at its left hand end by means of the projecting ends of a pair of spaced guides 14 and 15 which are to be described in greater detail hereinafter. At the right hand end of the member 10 adjacent the saw 12, there is illustrated a pair of oppositely disposed guides 16 and 17 which may be adjusted to any desired degree of separation. These guides 16 and 17 are adapted to receive a number of boards in an edgewise manner as they are discharged from the saw 12 and guide them in this manner as they are pushed over the member 10 between the members 14 and 15.

At the right hand end of the members 14 and 15, where the boards are presented, as previously stated, in an edgewise manner, there are provided respectively upon the guides 14 and 15 suitable cleats 18 and 19. These cleats 18 and 19 are of such configuration and are so disposed that as the boards advance therebetween, they will be inclined out of their vertical edgewise position until, when they are finally discharged therefrom, they will be arranged in a horizontal edgewise position, one above the other, and when finally discharged from the member 10 will be presented to the saw 11 so that they will be sawed again at an angle to that at which they were originally sawed by the saw 12. The guides 14, 15, 16 and 17 are shown as held in position by suitable brackets 20 which are adjustably held upon the member 10 by means of bolts 21 so that the guides may be disposed with different degrees of separation, as determined by the thickness and width of the boards being sawed.

For a better understanding of the mode of operation of my improved rip saw trough, reference should be had to Figs. 2, 3, 4, 5 and 6, wherein it will be seen that the boards designated by the numeral 22 are tipped from a vertical position to a horizontal position in progressing through the trough from the point illustrated in Fig. 2 to the point illustrated in Fig. 6. In Fig. 2, which corresponds to the point where the boards enter between the guides 16 and 17, the boards 22 are shown as in their vertical position, the boards 22 in this illustration being four in number and having been produced by passing a block of slightly larger dimensions through a set of three saws which have served to slice the block into four distinct boards of a predetermined thickness. As the boards 22 reach the point illustrated in Fig. 3, it will be seen that they will be allowed to tilt slightly to one side and that, as they reach the point illustrated in Fig. 4, they will be definitely inclined to a predetermined angle by the cleats 18 and 19 upon the guides 14 and 15, and that, as they advance further along between the cleats 18 and 19, they will be tipped to an almost horizontal position, as illustrated in Fig. 5, so that when they have finally advanced to the point illustrated in Fig. 6 they will readily assume a horizontal position, one above the other, and thus be in a position where, with a single saw or number of saws, they may be again sawed to a predetermined width.

In illustrating my invention, I have shown a trough which is particularly adapted to relatively short lengths of board, but it will be readily understood that by lengthening the various parts and properly spacing the cleats 18 and 19 with respect to the guides 16 and 17, it will be possible to guide and rearrange boards of substantially any length, the only consideration here being that the position of the cleats 18 and 19 be sufficiently distant from the ends of the guides 16 and 17 to cause a tipping of the boards only after their trailing end has passed through the guides 16 and 17, for otherwise any tipping of the boards caused by the cleats 18 and 19 before they have passed out from between the guides 16 and 17 would tend to cause them to bind in the trough.

In order to prevent the accumulation of saw-dust in the trough formed as above outlined, I have provided suitable sawdust discharging apertures 23 and 24, the aperture 23 lying between the guides 16 and 17, and the aperture 24 between the guides 14 and 15.

In conjunction with the discharge end of the trough between the guides 14 and 15, I have also illustrated a wedge-like member 25 which is adapted to cause the pieces of lumber 22 to align with their edges in alignment so that when they are presented to the saw 11, the boards will be sawed to a uniform width. In other words, the wedge-like member 25 is adapted to guide the boards over against the guide member 14.

While I have shown the preferred form of my invention as now known to me, it is to be understood that various changes may be made in its construction without departing from the spirit of the invention as defined in the appended claims.

Having thus described my invention, what I claim and desire to secure by Letters Patent is:

1. A rip trough for board sawing machinery comprising a member adapted to be supported at each end between two saw machines, adjustably spaced vertically extending guides upon said member forming a trough thereupon through which lumber may pass, and means carried by said guides adapted to turn the lumber through an angle of ninety degrees as it passes through the trough.

2. In a rip trough for board sawing machinery the combination of a horizontally disposed member, and means at each end of said member for supporting it with its upper surface on a level with the surface of two saw machines, adjustably spaced vertically extending guides upon said member forming a trough thereupon through which the lumber may pass, and oppositely disposed guides upon said vertically disposed guides adapted to change the angle of disposition of the lumber as it passes therethrough.

3. In a rip trough for board sawing machinery for use in connection with two saws spaced from each other and adapted to cut boards both with respect to thickness and breadth, the combination of, a member adapted to be supported at its ends between the two saw machines to form a support for the lumber as it travels therebetween, adjustably spaced vertically extending guides upon said member forming a trough thereupon for guiding the lumber thereover, and means upon said guides adapted to turn the lumber through an angle of ninety degrees as it travels from one machine to the other.

4. A rip trough of the character described, comprising a member extending between two sawing means, a pair of guides connected to said member and forming a trough thereon, means carried by said guides for causing lumber passing through said trough to be turned, and a member carried by one of said guides for aligning the edges of pieces of lumber as they leave the trough.

5. A device of the character described for receiving lumber cut by one sawing means and delivering it to a second sawing means, comprising a relatively narrow trough adjacent the first sawing means, a broader trough adjacent the second sawing means and in alignment with said narrow trough, and means carried by the broad trough for causing the lumber passing from the narrow trough to the broad trough to be turned through a predetermined angle.

6. A device of the character described for receiving lumber cut by one sawing means and delivering it to a second sawing means, comprising a relatively narrow trough adjacent the first saw, a broader trough adjacent the second saw and in alignment with said narrow trough, means carried by the broad trough for causing the lumber passing from the narrow trough to the broad trough to be turned through a predetermined angle, and means at the end of the broad trough adjacent said second saw for guiding the lumber to the saw.

7. A rip trough of the character described, comprising a member extending between two sawing means, a pair of guides connected to said member and forming a trough thereon, means carried by said guides for causing lumber passing through said trough to be turned, and a member carried by one of said guides for guiding the lumber to one of said sawing means.

FLOYD B. HAGAR.